(12) United States Patent
Wolleschensky et al.

(10) Patent No.: US 8,773,759 B2
(45) Date of Patent: Jul. 8, 2014

(54) MICROSCOPE HAVING AN ADJUSTMENT DEVICE FOR THE FOCUS RANGE

(75) Inventors: Ralf Wolleschensky, Jena (DE); Michael Kempe, Jena (DE); Christopher Power, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 252 days.

(21) Appl. No.: 13/121,886

(22) PCT Filed: Sep. 22, 2009

(86) PCT No.: PCT/EP2009/006814
§ 371 (c)(1),
(2), (4) Date: Mar. 30, 2011

(87) PCT Pub. No.: WO2010/037483
PCT Pub. Date: Apr. 8, 2010

(65) Prior Publication Data
US 2011/0176206 A1    Jul. 21, 2011

(30) Foreign Application Priority Data
Sep. 30, 2008    (DE) .......................... 10 2008 049 885

(51) Int. Cl.
*G02B 21/00*    (2006.01)

(52) U.S. Cl.
USPC ........................................................ 359/383

(58) Field of Classification Search
USPC ........................................................ 359/383
See application file for complete search history.

(56) References Cited

U.S. PATENT DOCUMENTS 7,270,431 B2 *   9/2007   Goelles et al. ................ 359/868
7,800,750 B2 *   9/2010   Bustamante et al. ......... 356/244

FOREIGN PATENT DOCUMENTS

| EP | 1 746 448 | 1/2007 |
|---|---|---|
| WO | WO 2008/078083 | 7/2008 |
| WO | WO 2008078083 A1 * | 7/2008 |

OTHER PUBLICATIONS

English language translation of the International Preliminary Report on Patentability and Written Opinion of the International Searching Authority-Forms PCT/IB/373,PCT/ISA/237.
Botcherby, Edward J., et al.; "Aberration-free optical refocusing in high numerical aperture microscopy"; Optics Letters Jul. 15, 2007; 32(14):2007-2009.

* cited by examiner

*Primary Examiner* — Stephone B Allen
*Assistant Examiner* — Tamara Y Washington
(74) *Attorney, Agent, or Firm* — Duane Morris LLP

(57) ABSTRACT

A microscope with means for adjusting the focal range, comprising a first objective lens for transmitting the object light of an illuminated object in the direction of a detector, with a second objective lens being disposed in the direction of the light upstream of the detector, which second objective lens is followed by a first mirror that can be adjusted in the direction of the optical axis, with at least one second mirror for transmitting light from the first objective lens in the direction of the second objective lens and from the second objective lens to the detector being disposed in the optical path, which second mirror is a fully reflective mirror, or a microscope with means for adjusting the focal range, comprising a first objective lens for transmitting the object light of an illuminated object in the direction of a detector, with a second objective lens being disposed in the direction of light upstream of the detector, which second objective lens is followed by a first mirror that can be adjusted in the direction of the optical axis, with a polarizing beam splitter for splitting the object light into two components that are oriented perpendicular to each other being disposed between the first and the second objective lens for light transmission.

9 Claims, 3 Drawing Sheets

Key: 1 Detector

PRIOR ART

Key: 1  Detector

MICROSCOPE HAVING AN ADJUSTMENT DEVICE FOR THE FOCUS RANGE

RELATED APPLICATIONS

The present application is a U.S. National Stage application of International PCT Application No. PCT/EP2009/006814 filed on Sep. 22, 2009 which claims priority benefit of German Application No. DE 10 2008 049 885.8 filed on Sep. 30, 2008, the contents of which are incorporated by reference in their entirety.

FIELD OF THE INVENTION

In confocal microscopy, multiphoton microscopy three-dimensional images of biological samples are produced at high resolution.

Optical sectional images of the sample may be captured at different depths of focus.

Conventional focal adjustment by moving the sample relative to the objective lens has a number of disadvantages with respect to the speed at which the sample is moved and how the sample is affected.

BACKGROUND

In *Optics Letters*, vol. 32, No. 14, Jul. 15, 2007, FIG. 1(c), Botcherby et al. describe a useful aberration-free internal focusing method which is schematically illustrated in FIG. 1 of the present description. O1 is the objective lens of the microscope, T1 is a first tube lens and T2 is a second tube lens.

On the side of a partially reflective beam splitter DM facing away from the objective lens O1, a plane mirror RM is disposed downstream of a second objective lens O2. The beam splitter couples out detection light from the sample in the direction of a detector.

The light emitted by the sample is collected by O1, and the 4f system that is formed by the tube lenses T1 and T2 forms pupil P1 of the first objective lens into pupil P2 of the second objective lens. As a result, the second objective lens O2 which is identical to the first objective lens O1 generates a three-dimensional image of the sample in its focal plane.

A suitable detector that would lie in the focal plane of O2 could detect a diffraction-limited image of a selected image region.

The plane mirror RM is disposed in the focal plane of O2 and can be moved relative to the optical axis.

The optical system comprising O2, the beam splitter DM, a tube lens T3 and the detector generates an image of the focal plane of O2 in the plane of the detector. By moving mirror RM along the optical axis, the plane of interest of the sample is imaged into the plane of the detector. By back-imaging through objective lens O2 which is identical to O1, the spherical aberrations generated by the optical system used are compensated for, and an aberration-free diffraction-limited image is generated in the plane of the detector.

Using a partially reflective beam splitter as shown in FIG. 1 entails light losses of up to 75% during the detection of the sample light, and as a result, the sensitivity of the system is reduced. Especially when working with weakly fluorescing samples, this can be a marked disadvantage.

OBJECTS OF THE PRESENT INVENTION

The present invention, as illustrated in FIGS. 2 and 3, successfully avoids these disadvantages.

The system can be suitably used to detect all of the light emitted by the sample.

In a first configuration according to the present invention, a fully reflective prismatic deflection element PM and a corner reflector WS as retroreflector are used to direct the light emitted by the sample through the second objective lens. In a first sub-area F1 of the deflection element PM, the light emitted by the sample is reflected to the side and imaged into the pupil plane P2 of O2.

On an area F4 of the corner reflector WS, the light is deflected into the focal plane of the objective lens and, from there, directed to area F3 which is symmetrical with respect to F4 and which returns the light through objective lens O2 into the direction of the prismatic element PM. There, the light impinges upon area F2 and is deflected in the direction of the detector.

By configuring the corner reflector WS so that it can be moved relative to the optical axis, it is possible to change the plane of focus as described in the literature.

Because of the symmetrical configuration of two identical objective lenses O1, O2, the focal plane viewed is again largely aberration-free.

BRIEF DESCRIPTION OF THE DRAWINGS

The invention will be described in connection with the annexed drawings, in which.

DESCRIPTION OF THE EMBODIMENTS

Figure 1:
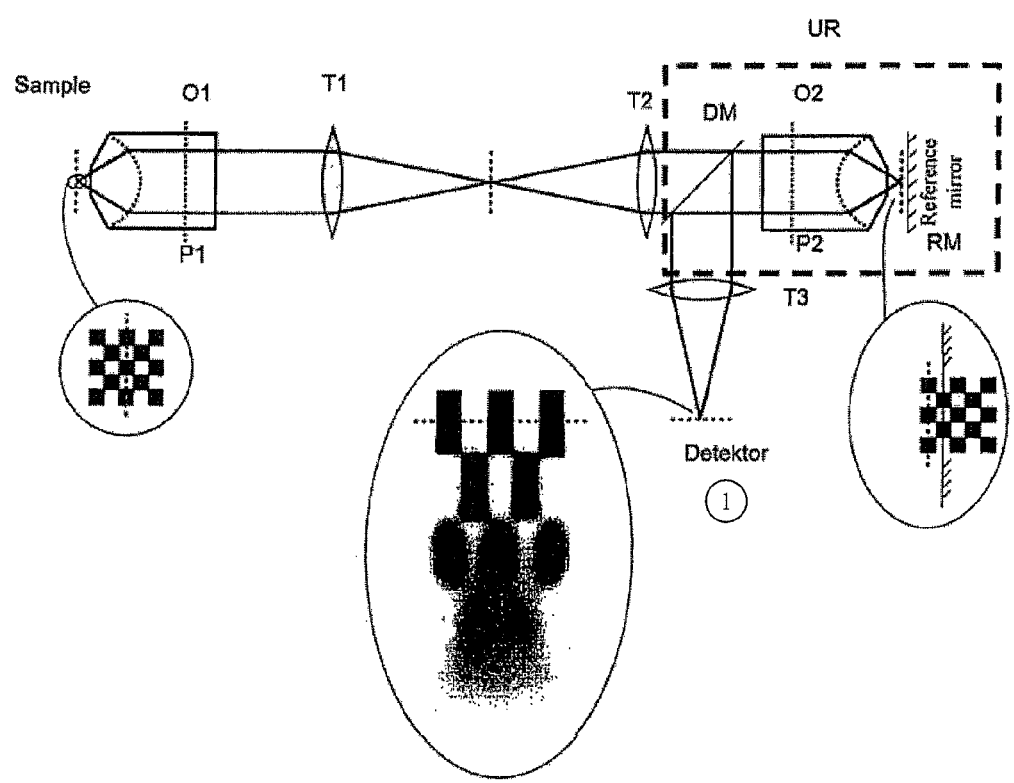
FIG. 1 is a schematic illustration of a microscope with focal adjustment according to the prior art.
Figure 2:
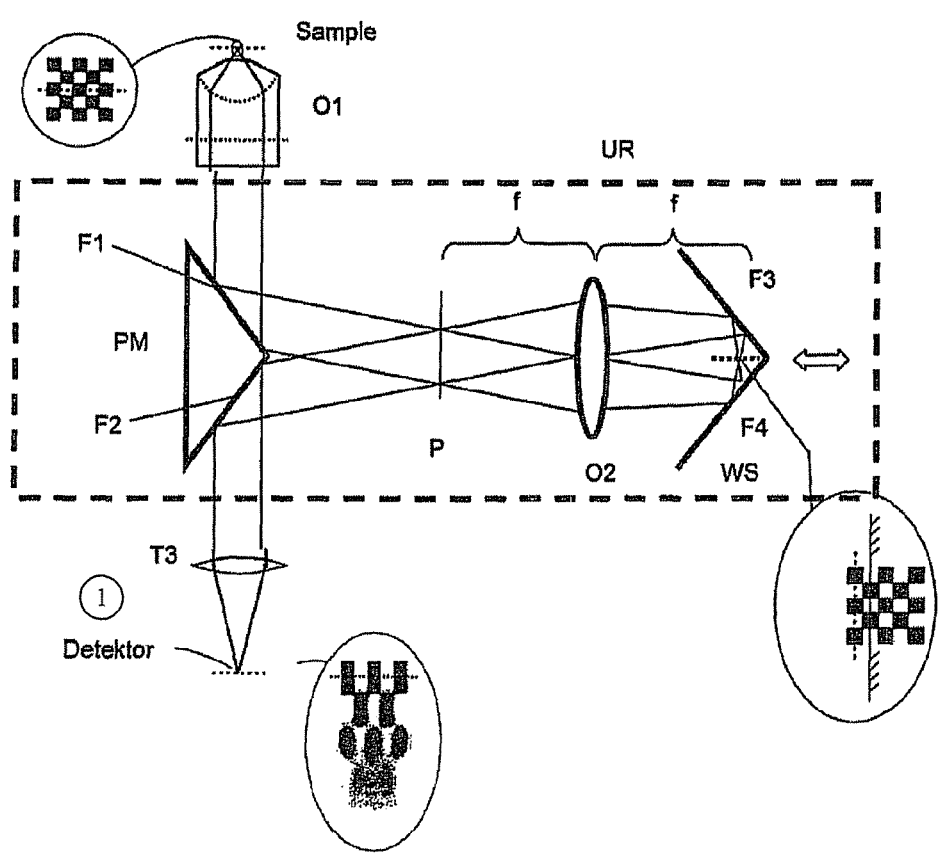
FIG. 2 is also a schematic illustration of a microscope with adjustment according to the present invention.
Figure 3:
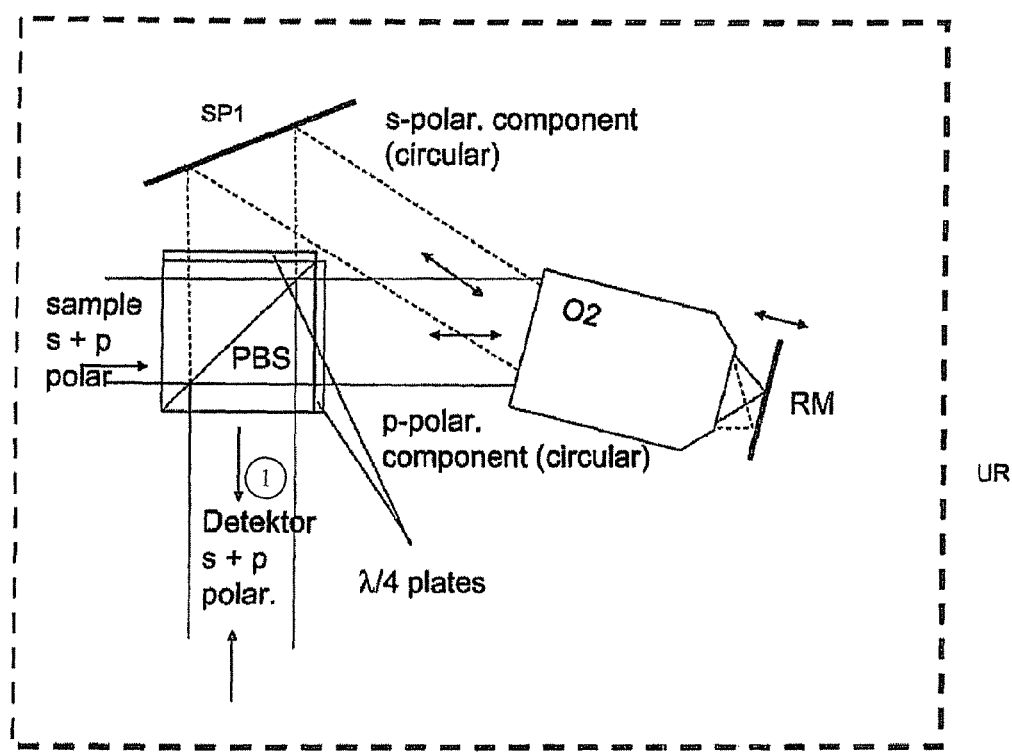
FIG. 3 shows such a microscope with a polarizing beam splitter.

For the sake of clarity, not all elements of FIG. 1 were included in FIGS. 2 and 3; the broken-line contour UR in FIG. 1 and in FIGS. 2 and 3 shows an example of how the configuration of FIGS. 2 and 3 could be incorporated into FIG. 1 by replacing the configuration shown. To this end, the person skilled in the art can modify the optical path as needed.

In FIG. 3, a polarizing beam splitter PBS with λ/4 plates is used to advantage.

The exciting light is preferably s-polarized.

The s-polarized component of the light emitted by the sample is reflected by the PBS and directed via mirror SP1 into the objective lens O2, downstream of which a movable mirror RM is disposed.

The p-polarized component of the light emitted by the sample is directed by the PBS directly into O2.

Both components that are reflected by mirror RM are combined by the PBS and deflected into the direction of the detector.

Useful embodiments of the invention within the context of the actions and knowledge of those skilled in the art are hereby incorporated into the disclosure.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

The invention claimed is:

1. A microscope with means for adjusting the focal range, comprising a first objective lens for transmitting object light of an illuminated object in the direction of a detector, a second objective lens disposed in the direction of light upstream of the detector, said second objective lens being followed by a corner reflector that can be adjusted in the direction of the optical axis, to direct light emitted by the illuminated object back through said second objective lens and then to the detector.

2. The microscope of claim 1, wherein the first and the second objective lens have an identical optical construction.

3. The microscope of claim 1, comprising a first mirror for transmitting light into the direction of the second objective lens and a second mirror for transmitting light from the second objective lens to the detector.

4. The microscope of claim 3, wherein both mirrors are side faces of a reflective prism.

5. The microscope of claim 1, further comprising a polarizing beam splitter for splitting the object light into two components that are oriented perpendicular to each other disposed between said first and said second objective lens for light transmission.

6. The microscope of claim 5, further comprising beam deflection means for deflecting components reflected by the polarizing beam splitter into the direction of the second objective lens.

7. The microscope of claim 5, wherein the split light components pass through the second objective lens and, after reflection by the adjustable mirror, are directed jointly through the polarizing beam splitter in the direction of the detector.

8. The microscope of claim 5, wherein the first and the second objective lenses have an identical optical construction.

9. The microscope of claim 1, wherein the object light includes fluorescent radiation.

* * * * *